United States Patent [19]

Simonds

[11] Patent Number: 5,141,689
[45] Date of Patent: Aug. 25, 1992

[54] METHOD FOR MANUFACTURING A COMPRESSION MOLDED ARCHERY BOW LIMB

[75] Inventor: Gary L. Simonds, Gainesville, Fla.
[73] Assignee: Bear Archery, Inc., Gainesville, Fla.
[21] Appl. No.: 648,693
[22] Filed: Jan. 31, 1991
[51] Int. Cl.⁵ .............................................. B32B 17/04
[52] U.S. Cl. .................................. 264/138; 124/23.1; 249/52; 264/258; 273/DIG. 7
[58] Field of Search ............... 124/23.1, 25.6, 900; 264/257, 258, 138, 154, 155, 325; 273/DIG. 7; 249/52; 156/175, 173, 245, 267

[56] References Cited

U.S. PATENT DOCUMENTS

| | | | |
|---|---|---|---|
| 2,813,818 | 11/1957 | Pearson | 273/DIG. 7 |
| 2,980,158 | 4/1961 | Meyer | 273/DIG. 7 |
| 3,486,495 | 12/1969 | Allen | 124/25.6 |
| 3,657,040 | 4/1972 | Shobert | 156/180 |
| 3,844,268 | 10/1974 | Ikoya | 124/88 |
| 4,350,138 | 9/1982 | Caldwell | 124/25.6 |
| 4,541,401 | 9/1985 | Caldwell | 124/900 |
| 4,649,889 | 3/1987 | Johnston | 124/23.1 |
| 4,660,537 | 4/1987 | Johnston | 124/25.6 |
| 4,712,533 | 12/1987 | Cruise | 124/25.6 |
| 4,735,667 | 4/1988 | Johnston | 264/137 |

FOREIGN PATENT DOCUMENTS 1312253 4/1973 United Kingdom .......... 273/DIG. 7

Primary Examiner—Jay H. Woo
Assistant Examiner—Robert B. Davis
Attorney, Agent, or Firm—Malina & Wolson

[57] ABSTRACT

An improved archery bow limb fabricated by inserting a moldable slug having a plurality of longitudinally oriented resin impregnated fiber glass filaments into a bow limb profiling compression mold. The mold includes a female cavity mold and a male mold. The female mold having a raised portion defining a limb tip slot impression area so that when the mold is closed a depressed tip slot is formed in the slug. The raised portion may include peripherally thereabout, reinforcing filaments for strengthening the slot edge defined by said periphery. After the slug has been cured, the material remaining in the base of the depression is removed thereby providing a bow limb having a pair of forks for supporting an eccentric therebetween. The resulting bow limb being fabricated with a reduced amount of severed longitudinal filaments.

36 Claims, 5 Drawing Sheets

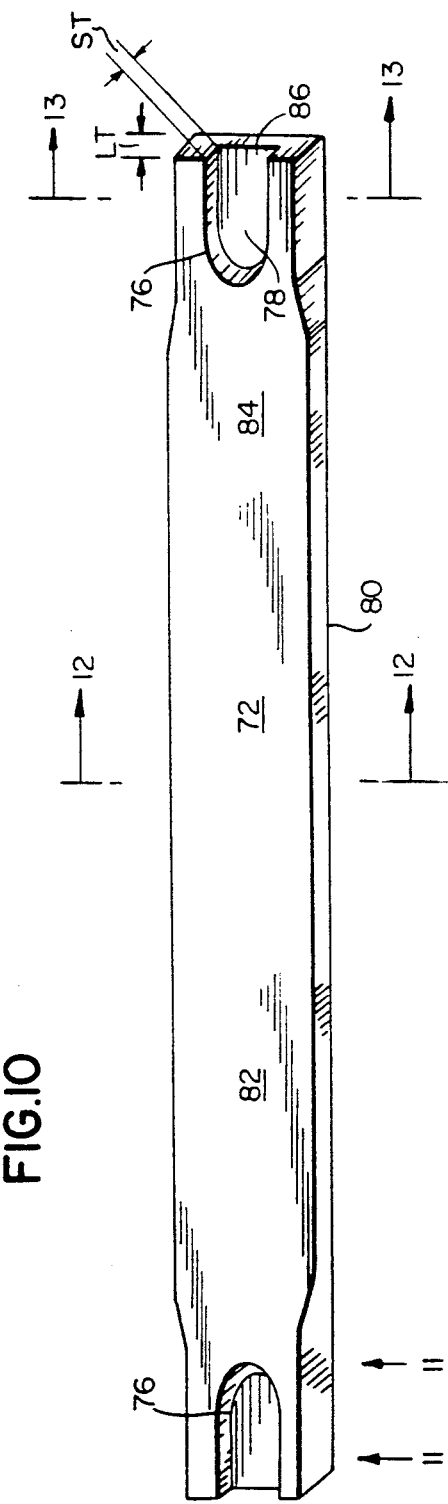
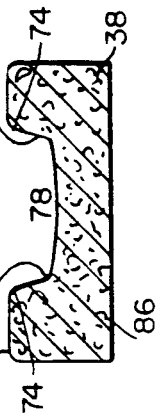
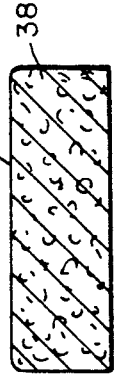
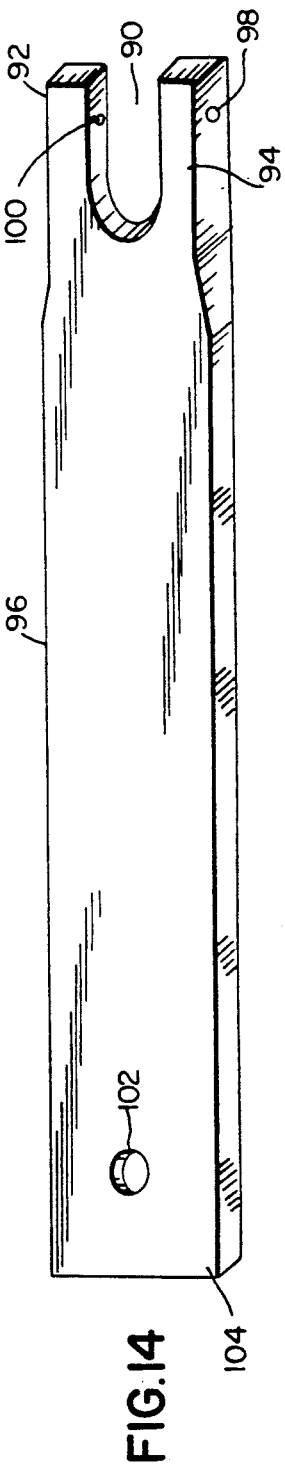

METHOD FOR MANUFACTURING A COMPRESSION MOLDED ARCHERY BOW LIMB

CROSS-REFERENCE TO RELATED APPLICATIONS

There are no related patent applications.

STATEMENT AS TO RIGHTS TO INVENTION MADE UNDER FEDERALLY SPONSORED RESEARCH AND DEVELOPMENT

The invention disclosed and claimed herein was not made under any federally sponsored research and development program.

BACKGROUND OF THE INVENTION (1) Field of the Invention

The present invention relates generally to archery bows and more particularly pertains to an improved compression molded archery bow limb and method for manufacturing the same.

(2) Description of the Prior Art

Archery bow limbs are an important component of archery bows. Their function is to store energy when the archer draws the bow string rearwardly. Typically, the bow limbs are made of resilient material which will be flexed rearwardly, thus storing energy, as the bowstring is drawn. When the archer releases the bowstring, the bow limbs will return to their normal unflexed position, and the energy previously stored in the limbs will be released to the bowstring causing the nocked arrow to be propelled fowardly. Such archery bow limbs have been manufactured from reinforced glass fiber materials for a number of years. Early reinforced glass fiber limbs were formed by machining the limb profile entirely from a unitary molded block of reinforced fiberglass material. It was recognized, however, that besides being time consuming and expensive, the machining process also severed load bearing glass fiber strands. That resulted in weaker limbs that could not be flexed at high stress levels for the desired limb life cycles.

In response to the problem caused by machining the reinforced glass fiber material, processes were developed, such as disclosed in U.S. Pat. Nos. 4,649,889; 4,353,769; and 4,390,156, which permitted the limb profile, with the exception of the limb tip slots, to be directly molded. It was believed that it would not be practical to mold the limb tip slots (i.e., the slots within which the eccentric wheel cams of a compound bow are seated) because, for example, as was stated in U.S. Pat. No. 4,649,889, different bows may require different size wheel cams making the cost of the dies to produce different size wheel cams prohibitive.

Therefore, it has been customary in the prior art to form the limb tip slots by grinding away, rather than molding, the limb material in this area from the limb block to provide sufficient clearance to mount the the paricular size eccentric wheel or cam and cable system to the end of the limb. This results in fiber reinforcement in the limb tip slot area being cut away, and even when the tip slots are radiused properly it may fracture and/or cracking may occur at or near the base of the slot. In order to overcome this deficiency the prior art has resorted to a number of solutions involving various methods.

One such method is to increase the limb thickness around the base of the slot, thus reducing both the bending and shear stresses in this area, and reducing the tendency to fracture. This solution, however, increases the mass weight of the limb and detracts from the aesthetic appearance of the bow.

Another method has been to apply a reinforcement pad or layer of material over the tip slot area. The reinforcement material strengthens the area and serves to hold the severed fibers on the limb tension side in position with the severed fibers no longer being the outermost fibers. In this manner the severed fibers are under less stress.

A third method is to employ a compression fitting. In its simplest form, two discs are attached to the bow limb at the base of the tip slot. One disc includes a clearance hole and the other disc is threaded to accept a capscrew. A clearance hole is drilled through the limb at the base of the limb slot, and the discs are then attached to the limb, one above and one below, so that the limb is sandwiched therebetween. Tightening of the screw draws the two discs together to apply pressure to the limb material at the base of the slot. This action compresses the limb material in this area reducing the tendency of the fibers to lift or cracks to form. Additionally, these disc washers conceal any cracks that do in fact occur. This use of additional components, however, increases the assembly and material costs of the bow limb.

SUMMARY OF THE INVENTION

The purpose of the present invention is to provide an archery bow limb for a compound bow that has all the advantages of similarly employed prior art bow limbs and has none of the disadvantages. The present invention comprises an archery bow limb of superior strength and substantially increased fatigue life and a method for fabricating the bow limb. The limbs are compression molded, profiled and designed with a portion of the limb tip slot formed into the limb on the side that has its glass fiber filaments in tension when the bow is flexed. Thereafter, the portion of the limb tip slot is removed during a subsequent secondary operation, as by machining, sawing or grinding to form the limb tip slot. In addition, it has been found that forming a portion of the limb tip slots with a radius molded into and along the slot edge eliminates additional secondary operations. The mold or die in the area of the limb tip slot may be designed to accept reinforcement fiber filaments of selected composition around the radius of the tip slot. Such fiber filaments provide strength and a smooth transition about the slot base without trapping air in this area. This procedure, in effect, places an array of continuous load bearing fibers all along the radius edge of the limb tip slot thereby reducing the likelihood of cracks being initiated along this surface.

Accordingly, it is an object of this invention to provide a low cost, reliable, high strength compression molded archery bow limb.

Another object of the instant invention is to provide a filament wound compression molded bow limb for a compound archery bow in which the machining operation is minimized and few filaments are severed in the high stress areas during the manufacture of the limb.

A still further object is the provision of apparatus and a method for compression molding an archery bow limb including a partially formed limb tip slot.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWINGS

FIG. 3' is a perspective side elevation view similar to that of FIG. 3 of an alternative mold assembly;

FIG. 10 is a perspective view of the limb paddle after compression molding and removal of the fiber tail;

FIG. 11 is a side elevation of one end of the limb paddle;

FIG. 12 is a sectional elevation taken along line 12—12 of FIG. 10;

FIG. 13 is another sectional elevation taken along line 13—13 of FIG. 10; and,

FIG. 14 is a perspective view of the finished archery bow limb made in accordance with the present invention.

DETAILED DESCRIPTION OF THE PREFERRED EMBODIMENT

Figure 1:
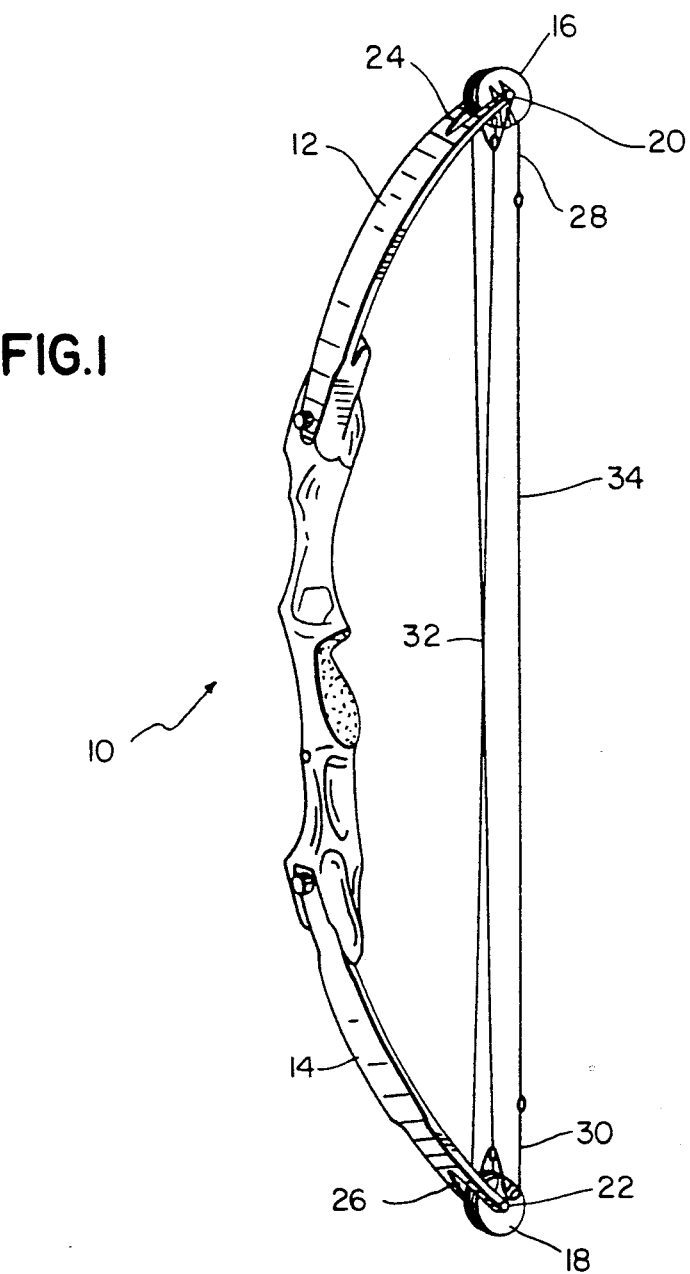
FIG. 1 is a perspective view of a typical compound archery bow illustrating the various components thereof and including the bow limbs of the present invention.

In the illustrated embodiment of FIG. 1 a compound archery bow generally designated at 10 includes a pair of opposed limbs 12, 14, which carry centrally disposed variable leverage units such as eccentric pulleys 16, 18 supported for rotary movement about axles 20, 22. The pulleys 16, 18 are carried in limb tip slots 24 and 26 at their outer ends. Segments 28, 30 of draw cable 32 pass over eccentric pulleys 16, 18. Opposed limbs 12, 14 are short and relatively stiff. The limbs 12 land 14 are flexed by drawing bowstring 34 which is connected between the free ends of draw cable 32. The principle of the present invention and the attendant structural elements may generally be applied to compound bows which themselves are well known, and fully disclosed and described in the prior art.

Figure 2:
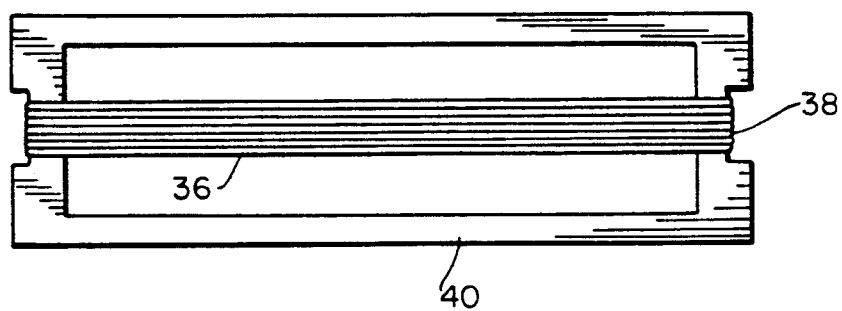
FIG. 2 is a plan elevation view of a slug frame with the impregnated filaments wrapped thereon.

Referring to FIG. 2, there is illustrated a glass fiber package or slug 36 from which the bow limbs 12 and 14 of the instant invention are fabricated. Glass fiber filaments 38 are initially dipped in a wet out tank containing a suitable resin and then wrapped around frame 40. A "wrap" is generally understood to mean one complete turn or loop around a frame such as 40. A plurality of wraps are necessary to form a limb and therefore the slug 36 consists of a number of wraps.

Both the glass fiber and the resins used therewith are well known in the art. Suitable materials include glass fiber filaments packaged in spools and sold by Pittsburgh Plate Glass Corp. under the designation No. 712-218 to be employed with Shell 826 epoxy resin and a suitable heat activated catalyst such as Lindride 6K manufactured by Lindow Chemical Company.

Figure 3:
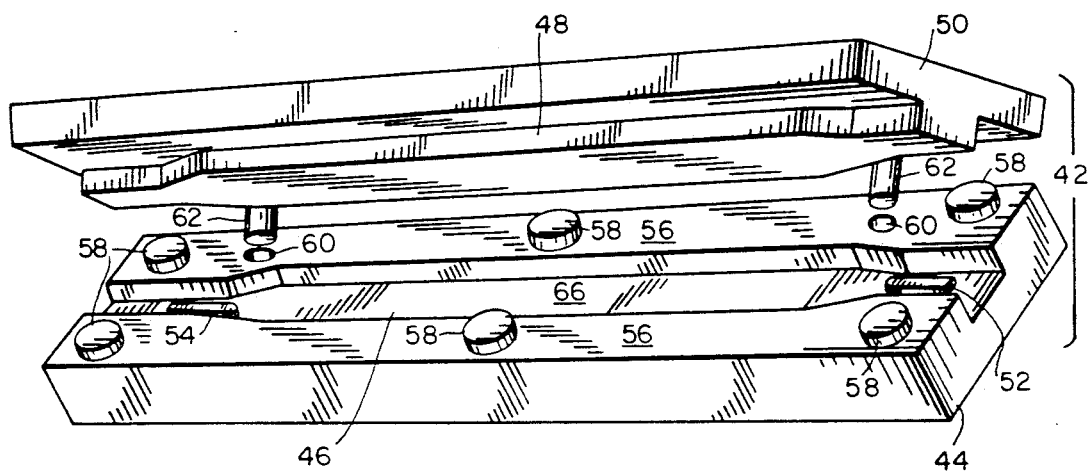
FIG. 3 is a perspective side elevation view of the mold assembly utilized in producing the bow limbs of the present invention.
Figure 3:
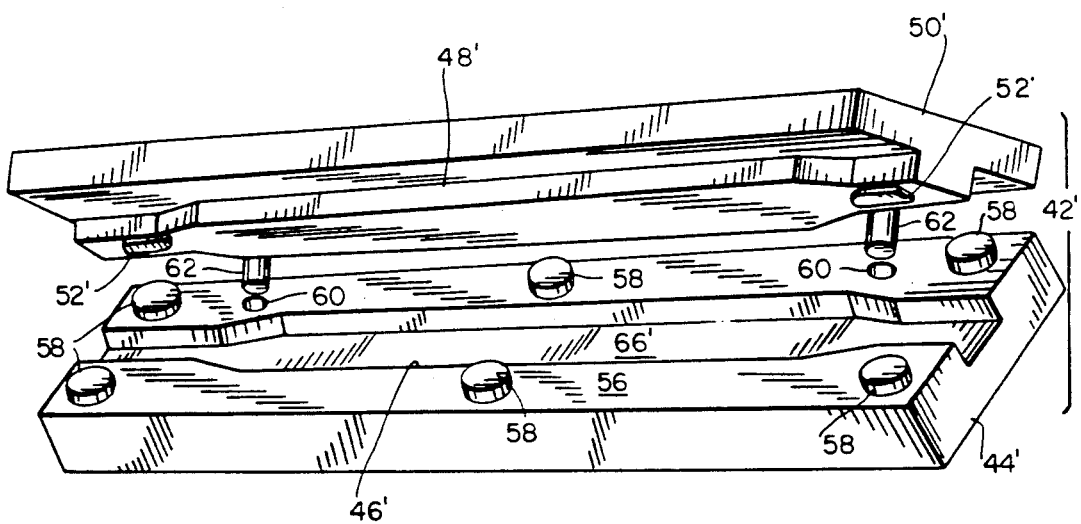
Figure 4:
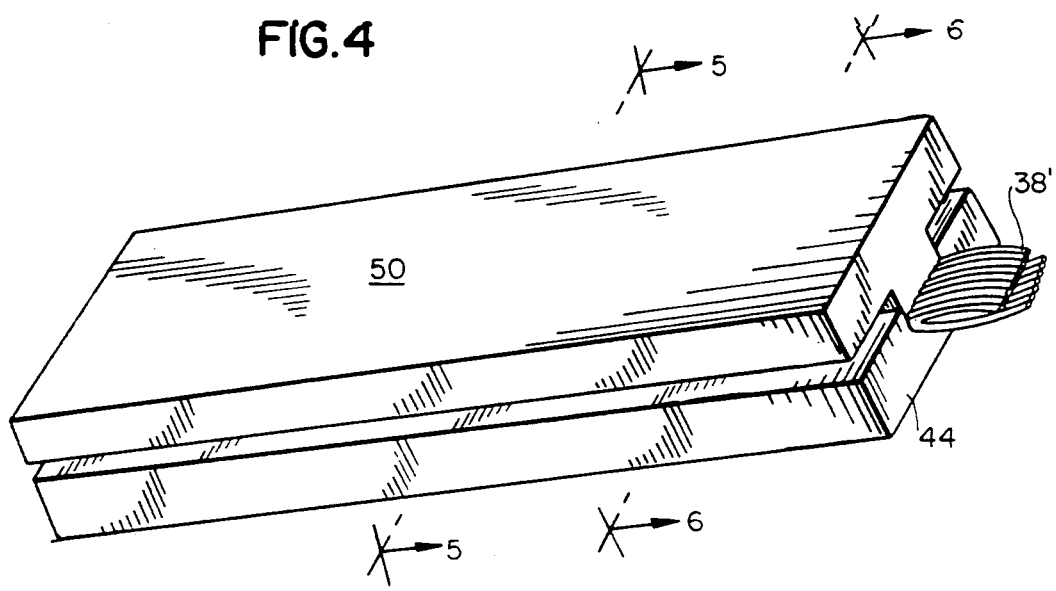
FIG. 4 is perspective view of the assembled mold during curing with a filament tail extending from the assembly.

Since the slug 36 is composed of properly impregnated glass fiber filaments it is in suitable condition to be molded by insertion into the mold or die assembly 42 illustrated in FIG. 3. The frame 40 is positioned so that the slug 36 extends longitudinally within the lower female die or mold 44 and the glass fiber filaments 38 extend out of the assembly 42 at both ends in the form of a tail 38' (see FIG. 4). The cavity 46 of the lower mold 44 in conjunction with the mating member 48 of upper mold 50 is shaped to form the slug 36 into a dual limb paddle. Disposed at opposite ends of cavity 46 and integral with the lower mold 44 are a pair of partial slot forming members 52, 54 (see FIG. 7). The lower mold 46 on its upper face 56 is provided with stops 58 which limit the depth of penetration of member 48 into the cavity 46 and openings 60 for receiving alignment pins 62 when the mold is closed.

The initial curing of the slug 36 is commenced by placing the closed mold assembly 44, containing the slug 36, into an oven or otherwise heated to approximately 300–350 degrees F. for about 5 to 10 minutes. Under the foregoing environment, the slug 36 is set or configured to assume a profile determined by the mold assembly 42 and then removed from the mold assembly 42. The glass fiber filaments forming the tail 38' are severed and the slug 36 or paddle is placed in an oven at approximately 350 degrees F. for about three hours for final or post cure.

It should be understood that the foregoing description of the curing procedure applies to those materials described hereinabove and therefore different procedures may be necessary where other resins and/or glass fiber may be utilized.

Figure 5:
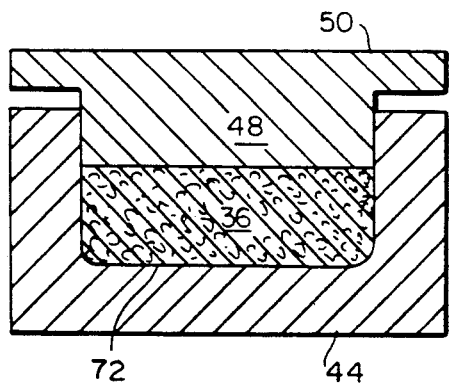
FIG. 5 is a sectional elevation taken approximately along line 5—5 of FIG. 4 viewed in the direction of the arrows.
Figure 6:
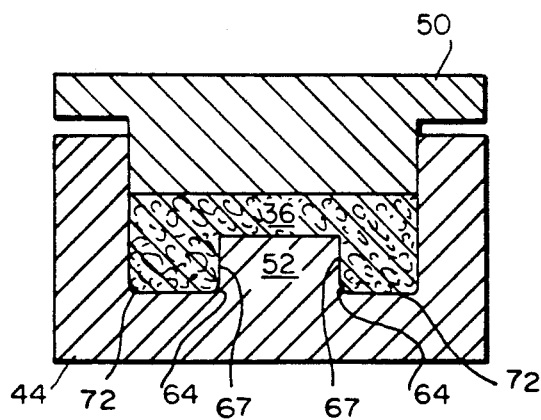
FIG. 6 is a sectional elevation taken approximately along line 6—6 of FIG. 4 viewed in the direction of the arrows.

The cross-section of the center of the slug 36 is illustrated in FIG. 5 where the member 48 of upper mold 50 is pressed into the lower mold 44 to configure the slug 36 therebetween. FIG. 6 in the same fashion illustrates the cross-sectional configuration of the slug 36 in the area of the slot forming member 52. It will be noted in FIG. 6 that the lower corner edges 64 of the slot forming member 52 are rounded so as to mold a radius along the edge of the tip slot in order to eliminate the necessity for any secondary material removal operation from the molded limb paddle, and to provide a smooth transition between the outer high tension limb surface 72 and the walls 67 formed by slot forming member 52 without severing any glass fiber filaments.

Figure 7:
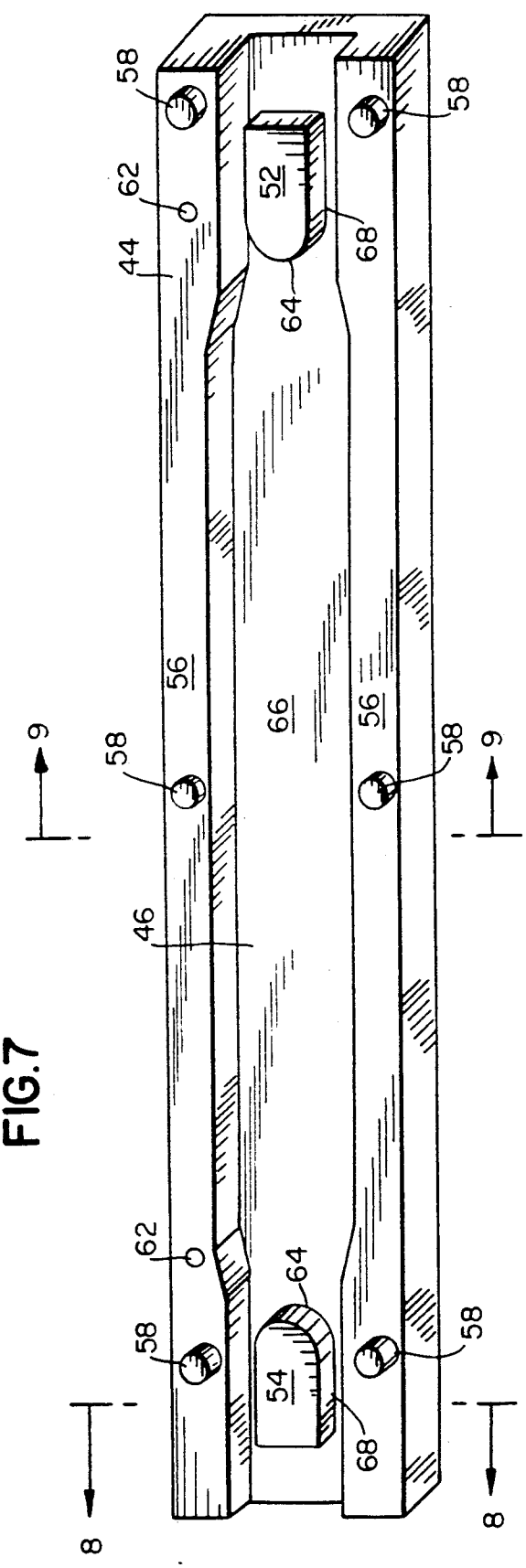
FIG. 7 is a perspective view of the lower mold showing a raised tip slot configuration.
Figure 9:
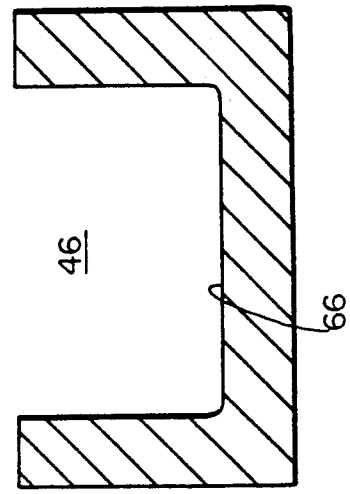
FIG. 9 is another sectional elevation taken approximately along line 9—9 of FIG. 7 viewed in the direction of the arrows.
Figure 8:
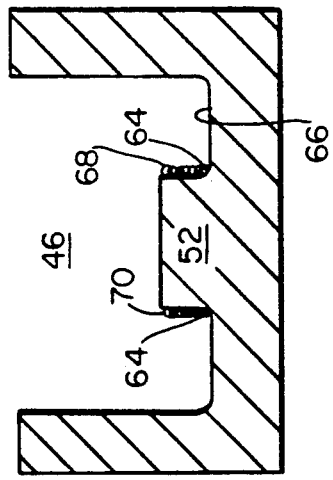
FIG. 8 is a sectional elevation taken approximately along line 8—8 of FIG. 7 viewed in the direction of the arrows.

Referring now to FIGS. 7, 8 and 9 which illustrate in greater detail the configuration of the lower female mold or die 44 of FIG 3. Extending upwardly from the cavity base 66 into the mold cavity 46 at opposite ends of the mold 44 are slot forming members 52 and 54. These members are selectively shaped to provide the desired limb tip slot dimensions and are of a thickness to partially form the slot in the limb. The thickness of the slot forming members 52 and 54 in conjunction with the depth of penetration of the upper mold mating member 48 determines the amount of the partial limb tip slot depression 78 (see FIG. 10) formed in the limb during molding. In addition, the thickness of the limb tip forks may be increased (see FIG. 11) to provide the molded paddle with a substantially constant cross-section and a corresponding relatively constant glass fiber to resin ratio throughout. As shown in FIGS. 10 and 11, the limb tips can be formed to provide sufficient tip thickness to accomodate axle journal openings 98 to be subsequently added ( shown in FIG. 14), for mounting the eccentric pulley axles 20, 22 therein.

In addition, by forming a portion of the limb slot on the limb tension side 72 of the limb with a radius 74 along the slot edge 76 see FIG. 13 there is provided a transition from the higher tension outer limb surface 72 to the open area 78 of the limb slot without cutting any load bearing fibers. Since it is known that sanding a radius on the edge of the limb tip slot reduces the tendency to lift fibers and initiate cracks , a radius molded or partially molded into the limb without severing any fibers would appear to be superior.

The fact that the surface 72 and slot edge 76 of the limb tip slot are joined by a radius, as described above, also greatly reduces the probability of developing longitudinal cracks. However, if such crack should be initiated at the edge of the slot, it could propagate down the limb. To prevent such cracks from occurring, two or more glass fiber filament rovings 70 saturated in resin, as shown most clearly in FIG. 8, can be draped around the upstanding wall 68 of slot forming members 52 and 54 in lower mold cavity 46 prior to insertion of the suitably prepared slug into the mold or die assembly. During initial curing of slug 36, the glass fiber filament rovings will become bonded to the glass fibers in the slug all along the radiused edge 76 see FIG. 10 of the limb tip slot, making the initiation of cracks along this surface less likely. Other fiber composite materials for reinforcement along the radiused edge 76 can also be used. For instance, an E-glass fiber limb might be reinforced with higher modulus materials such as "S" glass, aramid fibers such as those introduced by DuPont under the tradmark KELVAR ARAMID, or carbon fibers. The limb tip slot area can be likewise reinforced by aramid, carbon, glass or other high strength material in discontinuous and random form such as, for example, chopped fibers.

Reference is now made to the embodiment of FIG. 3' which in all manner is identical to the embodiment of FIG. 3, except that the upper or male mold 50' includes the tip slot forming raised area 52', 54' and the lower mold cavity 46' include a profiled base surface 66'.

Referring now to FIGS. 10-13, the paddle 80 (slug 36 after molding and curing with the tail removed) is divided at its center line 12—12 to form a pair of individual compression molded bow limbs 82, 84. It will be noted that the continuous load bearing fiberglass filaments 38 extend lengthwise of the paddle 80.

It is desirable to form the bow limbs 82, 84 with a substantially constant cross-section, even though the width and thickness may vary longitudinally, as disclosed in U.S. Pat. No. 4,649,889. In this manner, a constant ratio of resin to glass fiber is maintained for promoting uniform strength characteristics. Thus, for example, to obtain a constant ratio or resin to glass fiber in the present invention, the substantially constant cross-section of the bow limbs is achieved by having the limb paddle section shown in FIG. 13 being made thicker than the wider limb paddle section shown in FIG. 12. See FIG. 11 showing the variations in thickness.

As the limb tip slot 78 has only been partially formed into the limb, a base portion 86 must be removed during a subsequent secondary operation, as by machining, sawing or grinding out base portion 86 to form the finished limb tip slot. The resultant completed limb tip slot 90, as illustrated in FIG. 14, will thus define a tip forks 92, 94 in the limb 96 through which openings 98, 100 may be machined to permit axles 20, 22 to be journaled therein. An opening 102 is machined in the limb 96 at the end 104 opposite the limb tip slot 90. As shown in FIG. 1, a bolt 11 passes through opening 102 and is threaded into the bow handle 13 for attaching the limb thereto.

It has been found that a most suitable limb can be provided where the slot impression depth ST in the molded limb constitutes approximately one-half the limb thickness LT. (see FIG. 10) With the foregoing degree of slot impression depth it is believed to be unnecessary to physically separate the impregnated glass fiber filaments surrounding the slot forming members 52 and 54 prior to applying molding compression pressure. What appears to occur is that the upper male die 50 applies uniform pressure during mold compression and the fiber filaments tend to remain fairly parallel with a small percentage being forced from the top surface of the slot forming members 52 and 54 down the sides thereon into the limb tip forks, since the mold pressure increases in this area first. It has also been discovered that acceptable bow limbs can be fabricated where the slot impression depth varies from 15% to approximately 50% of the limb thickness.

Obviously many modifications and variations of the present invention are possible in the light of the above teachings. It is therefore understood that, within the scope of the appended claims, the invention may be practiced otherwise than specifically described.

Having thus described the invention, what is claimed as novel and desired to secure by Letters Patent is:

1. A method of compression molding an archery compound bow limb comprising the steps of:
 (a) forming a moldable slug composed of a plurality of longitudinally oriented resin impregnated glass fiber filaments;
 (b) disposing said slug into a compression mold profiled for a bow limb having limb tips thereon and a depression in the profiled limb defining a partial limb tip slot;
 (c) curing said slug; and
 (d) removing the material remaining in the partial limb tip slot to thereby form a completed limb tip slot.

2. The method of compression molding an archery compound bow limb as set forth in claim 1 wherein the material remaining in the partial limb tip is removed by machining.

3. The method of compression molding an archery compound bow limb as set forth in claim 1 wherein the material remaining in the partial limb tip is removed by sawing.

4. The method of compression molding an archery compound bow limb as set forth in claim 1 wherein the material remaining in the partial limb tip is removed by grinding.

5. The method of compression molding an archery compound bow limb as set forth in claim 1 wherein the completed limb tips are of sufficient thickness to include an opening to permit axles, on which variable leverage units are carried, to be journalled therein.

6. The method of compression molding an archery compound bow limb as set forth in claim 1 wherein the partial limb tip slot has a radius molded therein.

7. The method of compression molding an archery compound bow limb as set forth in claim 6 wherein said radius extends between the slot edge and the limb tension side.

8. The method of compression molding an archery compound bow limb as set forth in claim 1 wherein the partial limb tip slot is located on the tension side of the limb.

9. The method of compression molding an archery compound bow limb as set forth in claim 1 wherein the means for forming a depression in the profiled limb may be located in either an upper mold section or a lower mold section.

10. The method according to claim 1 wherein said compression mold is profiled to form a bow limb having a substantially constant cross-sectional area.

11. The method according to claim 1 further including the step of disposing reinforcing material along an edge defining said depression prior to said step of disposing said slug into a compression mold.

12. The method according to claim 11 wherein said reinforcing material comprises additional resin impregnated continuous glass fiber rovings.

13. The method according to claim 11 wherein said resin-forcing material is chopped glass, carbon or aramid fibers.

14. A method of compression molding an archery compound bow limb paddle comprising the steps of:
(a) forming a moldable slug composed of a plurality of longitudinally oriented resin impregnated glass fiber filaments;
(b) disposing said slug into a compression mold profiled for a bow limb paddle having limb tips thereon, and a depression in the profiled limb paddle defining a partial limb tip slot at each end thereof;
(c) curing said slug; and
(d) removing the material remaining in the partial limb tip slots to thereby form completed limb tip slots at each end of the paddle.

15. The method of compression molding an archery compound bow limb paddle as set forth in claim 14 wherein the material remaining in the partial limb tip slots is removed by machining.

16. The method of compression molding an archery compound bow limb paddle as set forth in claim 14 wherein the completed limb tips are of sufficient thickness to include an opening to permit axles on which eccentric cams are carried, to be journaled therein.

17. The method of compression molding an archery compound bow limb paddle as set forth in claim 14 wherein the partial limb tip slots have a radius molded therein.

18. The method of compression molding an archery compound bow limb paddle as set forth in claim 17 wherein said radius extends between the slot edge and the limb tension side.

19. The method of compression molding an archery compound bow limb paddle as set forth in claim 14 wherein the partial limb tip slots are located on the tension side of the limb paddle.

20. The method of compression molding an archery bow limb paddle as set forth in claim 14 wherein the means for forming a depression in the profiled limb may be located in either an upper mold section or a lower mold section.

21. The method of compression molding an archery compound bow limb paddle as set forth in claim 14 wherein said compression mold is profiled to form a bow limb paddle having a substantially constant cross-sectional area.

22. The method of compression molding an archery bow limb paddle according to claim 14 further including the step of disposing reinforcing material along an edge defining said depression prior to said step of disposing said slug into a compression mold.

23. The method of compression molding an archery compound bow limb paddle according to claim 22 wherein said reinforcing material comprises additional resin impregnated continuous glass fiber rovings.

24. The method of compression molding an archery compound bow limb paddle according to claim 22 wherein said reinforcing material is chopped glass, carbon or aramid fibers.

25. The method of compression molding an archery compound bow limb as set forth in claim 14 wherein the material remaining in the partial limb tips is removed by sawing.

26. The method of compression molding an archery compound bow limb as set forth in claim 14 wherein the material remaining in the partial limb tips is removed by grinding.

27. The method of fabricating an archery bow limb comprising the steps of:
(a) molding a bow limb composed of longitudinally resin impregnated glass fiber filaments and having an area defining a partial limb tip slot, said limb tip slot being of reduced thickness;
(b) removing said area of reduced thickness to thereby provide a limb tip fork.

28. The method of fabricating an archery bow limb according to claim 27 wherein the area of reduced thickness is removed by machining.

29. The method of fabricating an archery bow limb according to claim 27 wherein the area of reduced thickness is removed by sawing.

30. The method of fabricating an archery bow limb according to claim 27 wherein the area of reduced thickness is removed by grinding.

31. The method of fabricating an archery bow limb according to claim 22 wherein the limb tip fork includes an opening to permit axles on which variable leverage units are carried, to be journalled therein.

32. The method of fabricating an archery bow limb according to claim 27 wherein the area of reduced thickness has a radius molded thereon.

33. The method of fabricating the area according to claim 27 wherein the area of reduced thickness is located on the tension side of the limb.

34. The method of fabricating an archery bow limb according to claim 27 wherein the area of reduced thickness is located on the upper section of the archery bow limb.

35. The method of fabricating an archery bow limb according to claim 27 wherein the area of reduced thickness is located on the lower section of the archery bow limb.

36. The method of fabricating an archery bow limb according to claim 27 wherein the mold is profiled to form a bow limb having a substantially constant cross-sectional area.

* * * * *